Sept. 27, 1966 M. HIMMEL 3,275,186
PERCOLATOR COFFEE POT AND TOP THEREOF
Filed April 13, 1964

INVENTOR.
MARTIN HIMMEL
BY
J.B. Felshin
ATTORNEY.

United States Patent Office 3,275,186
Patented Sept. 27, 1966

3,275,186
PERCOLATOR COFFEE POT AND TOP THEREOF
Martin Himmel, Mount Vernon, N.Y. (% Bloom's Houseware, 415 E. Tremont Ave., Bronx, N.Y.)
Filed Apr. 13, 1964, Ser. No. 359,294
10 Claims. (Cl. 220—82.5)

The invention relates generally to percolator coffee pots, and more particularly to the tops thereof.

The common percolator coffee pot has a metal lid with a circular opening containing a removable glass top (sometimes called a knob or a dome). Usually, the tops must be replaced long before the rest of the coffee pot. Since the tops vary from one coffee pot to another, replacement may prove difficult and sometimes impossible. Often, for want of a top, an otherwise perfectly satisfactory percolator is discarded.

It is an object of the invention to provide a new and improved percolator coffee pot top assembly.

It is an object of the invention to provide a novel percolator coffee pot top assembly that will fit a variety of percolators.

It is an object of the invention to provide a novel percolator coffee pot top assembly which is self-adjusting to fit the lid snugly.

It is an object of the invention to provide a novel percolator coffee pot top assembly which locks when put in place.

It is an object of the invention to provide a novel percolator coffee pot top assembly which does not allow leakage of hot water or partially brewed coffee.

The present device will fit most percolators. Also it can be used as replacement for percolators where the metal cover wears loose, and the original glass top no longer fits. Also this percolator top sits tight in a percolator and will not fall out even after long use.

According to the invention there is provided, a top assembly for use with a percolator lid having a circular aperture comprising a generally cylindrical glass top whose diameter is smaller than the lid aperture so that part of the top may pass therethrough, said top having a circumferential lip larger than the lid aperture adapted to contact one side of the lid; and annular fastening means having an outer rim larger than the lid aperture adapted to contact the other side of said lid, and an inner portion adapted to be fastened to said top, and thereby secure the lid between the lip and the rim.

These and other objects and features of the invention are pointed out in the following description in terms of the embodiments thereof which are shown in the accompanying drawing. It is to be understood, however, that the drawing is for the purpose of illustration only and is not a definition of the limits of the invention, reference being made to the appended claims for this purpose. In the drawing:

Figure 1:
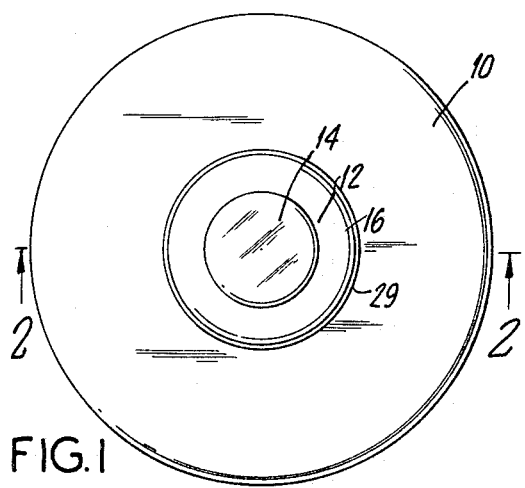
FIGURE 1 is a top view of a percolator lid having a top assembly constructed in accordance with the invention.
Figure 2:
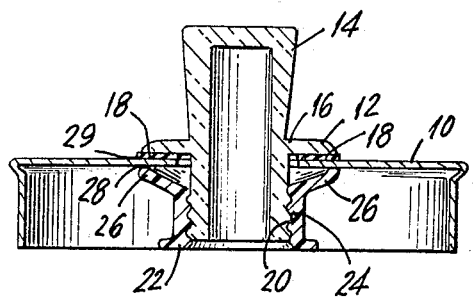
FIGURE 2 is a side cross sectional view taken through line 2—2 of the lid and top assembly of FIGURE 1.

Referring now to FIGURES 1 and 2 there is shown respectively a top and a cross sectional view of a percolator lid 10, having a central aperture 12. A top 14, generally of cylindrical shape, has an outside diameter less than that of the aperture so that part of the top passes through the aperture 12. The top 14 has a circumferential lip 16, whose outer diameter is greater than diameter of the aperture 12, so that the lip 16 engages a portion 18 of the lid surrounding the hole 12, thereby preventing the top from passing through the hole.

The end of the top which is adapted to pass through the hole 12 has a screw thread 20, which is adapted to engage a thread 24, on the inner ring of an annular shaped fastening member 22.

The annular member 22, has its outer rim or periphery 26, of a diameter larger than the diameter of the central opening 12 in the lid. The outer rim is shaped upward so that, as the member 22 is rotated with respect to the top 14, its screw 24 engages the threads 20 of the top and the rim 26 is forced against an underside 28 of the lid 10. Simultaneously the top 14 is drawn downward and its lip 16 presses against the top side 18 of the lid. Thereby the lid 10, top 14 and fastening member 22 are securely held together.

It should be noted that the lid aperture 12, and the outside of that portion of the top which passes through the aperture need no be of the same size, or even a close fit. The top assembly will attach to any lid so long as its opening is not larger than the lip 16, or the outer periphery 26. The opening must of course not be smaller than the diameter of that part of the top which passes therethrough. However, since the fit between the lid and the top is not critical, it is possible to enlarge a hole of any lid, whose hole is too small, and thus be able to attach the top assembly.

The top 14 is preferably made of glass with a conventional hollow center open at the bottom end; and the fastening means is preferably made of plastic. A gasket 29 may be placed on the upper side of the lid between surface 18 and the lower side of lip 16 to ensure a better fit and prevent possible chipping of the glass and bending of the metal lid.

The remaining figures show alternative embodiments of the invention. Elements which are common to more than one figure bear like legend in each figure in which they appear.

Figure 3:
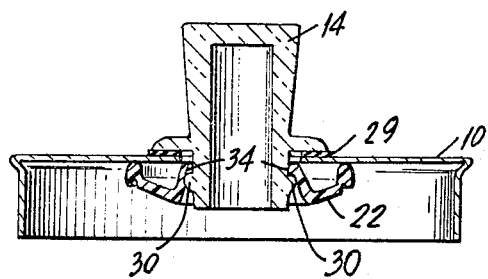
FIGURE 3 is a side cross sectional view of a percolator lid with an alternative embodiment of the novel top assembly.
Figure 3A:
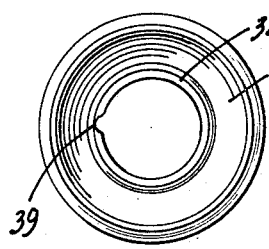
FIGURE 3A is a top view of the fastening member shown in FIGURE 3.

In FIGURES 3 and 3A the lower portion of the top 14 is shown having two oppositely spaced protrusions or knobs 30. The inside of the annular fastening member 22 instead of being threaded has a ridge 34 at its upper inner end for engaging the knobs 30 so as to retain itself and the top in place. A notch or dimple 39 (FIGURE 3A) is cut into the ridge 34 to enable the member to be snapped on to the protrusions and lower end of the top. If the fit between the ridge 34 and the lower end of the top is snug and the member is of a resilient material the pieces will snap together. If the fit is a little loose, or the member 22 is of a less resilient material, the top 14 should be rotated relative to the member 22 so neither of the knobs 30 is directly over the dimple 39, and thereby provide a better grip between the top and fastening member.

Figure 4:
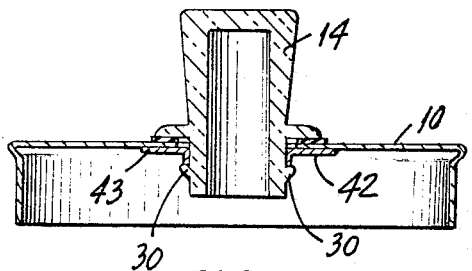
FIGURE 4 is a side cross sectional view of an alternative embodiment of the invention mounted in a percolator lid.
Figure 4A:
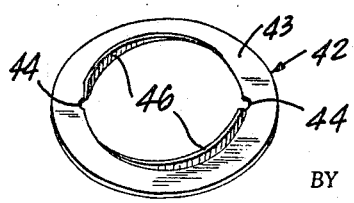
FIGURE 4A is a perspective view of the fastening member shown in FIGURE 4.

In FIGURES 4 and 4A there is shown a top having a knobbed lower end as in the previous figure engaging a metal fastening member 42. The member 42 has an upper periphery or rim 43 which is larger than the aperture 12 in the lid 10. The inner portion of the member 42 has two dimples 44 (FIGURE 4A) through which the knobs 30 on the top may pass. The inner walls or ridges 46 of the annular member 42 increase in height as they curve away from the dimples, so that as the top is rotated relative to the member 42 the knobs engage, and slide along the walls 46, whereby the top is forced downward against the lid, and the member 42 is forced upward against the lid.

Figure 5:
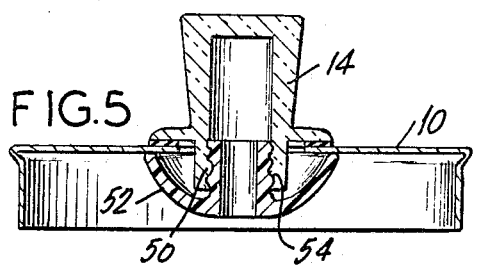
FIGURES 5 and 6 are side cross sectional views showing two additional alternative embodiments of top assemblies constructed in accordance with the invention, and mounted in percolator lids.
Figure 6:
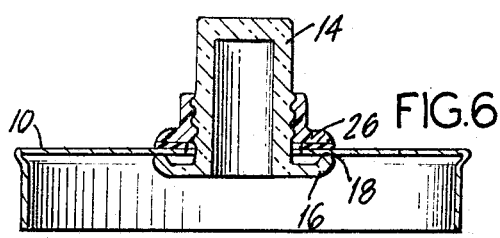

FIGURES 5 and 6 show two embodiments which are similar to the embodiment shown in FIGURE 2. In FIGURE 5 the bottom portion of the top 14 is threaded as in FIGURE 2, but is here threaded on its inside 50. The plastic fastening member 52 has a thread on an outside wall 54 of its inner portion.

In FIGURE 6 the location of the lip 18 and the fastening member ridge 26 are reversed with the lip 18 of the top 14 resting against the underside 28 of the lid 10; and the edge 26 of the fastening member 22 resting against the top side 18 of the lid 10.

Thus there has been shown and described an improved coffee pot top assembly capable of being inserted in lids having central openings of various sizes, and which also may be deformed in the region surrounding the central opening.

Although several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A percolator top member made of transparent material and being hollow and closed at its upper end and having a lower end portion open at its lower end, said top member having an annular transversely disposed portion extending radially outwardly of said lower portion and facing in one direction, and a clamp member having an annular portion disposed transversely of the axis of said top member and facing in an opposite direction, and a portion extending from said annular portion of said clamp member and offset therefrom in the direction of the axis of said top member, interengaging means on the lower end portion of said top member and on said offset portion of said clamp member, whereby to clamp said top member and clamp member to opposite sides of a substantially flat top wall of a percolator lid interposed between said annular portion of said top member and said clamp member, and having an opening through which said lower end portion may pass, whereby said top member may be clamped to any lid whose top wall opening is larger than said lower end portion of the top member and smaller than the outer periphery of the annular portion of said top member and the outer periphery of the annular portion of said clamp member.

2. The combination of claim 1, in combination with a percolator lid having a substantially flat top wall formed with a central opening through which the lower end portion of said top member passes, said opening in said top wall of said lid being of greater inner diameter than the outer diameter of said lower end portion and being spaced radially outwardly therefrom, and said annular portion of said top member and said clamp member having portions of greater diameter than said inner diameter of said opening in said top wall of said lid.

3. The combination of claim 1, the interengaging means on said offset portion comprising helical means.

4. The combination of claim 3, said interengaging means on the lower end of said top member comprising helical means engaging the helical means on said offset portion.

5. The combination of claim 1, said interengaging means on said offset portion of said clamp member comprising a helical edge extending to said annular transverse portion, and said transverse portion of said clamp member being formed wtih a notch adjacent the point where said helical edge meets said annular transverse portion.

6. The combination of claim 5, said clamp member having a central opening through which the lower end portion of the top member passes, and said offset portion being located at said opening.

7. The combination of claim 1, said interengaging means comprising external screw threads on said lower end portion of said top member, and internal screw threads on the offset portion of said clamp member.

8. The combination of claim 1, wherein said annular transversely disposed portion of said clamp member has an upwardly extending annular outer flange having an upper edge adapted to contact the underside of such lid top wall in radially outwardly spaced relation to the opening in said lid top wall.

9. The combination of claim 1, wherein one of said annular transversely disposed portions has an upwardly extending flange adapted to contact the underside of such lid top wall in radially outwardly spaced relation to the opening in said lid top wall.

10. The combination of claim 1, said transversely disposed annular portions of said top member and of said clamp member being of substantially equal outer diameter.

References Cited by the Examiner

UNITED STATES PATENTS

| | | | |
|---|---|---|---|
| 1,446,709 | 2/1923 | Leyse | 220—82.5 |
| 1,975,498 | 10/1934 | Billerman | 220—82.5 |
| 2,046,819 | 7/1936 | Hettinger | 220—82.5 |
| 2,560,214 | 7/1951 | Cameron | 99—285 X |
| 2,630,113 | 3/1953 | Zide | 99—285 X |

WALTER A. SCHEEL, *Primary Examiner.*

WILLIAM I. PRICE, *Examiner.*

S. P. FISHER, *Assistant Examiner.*

Disclaimer 3,275,186.—*Martin Himmel*, Mount Vernon, N.Y. PERCOLATOR COFFEE POT AND TOP THEREOF. Patent dated Sept. 27, 1966. Disclaimer filed Nov. 12, 1973, by the assignee, *Tops Manufacturing Company, Inc.*

Hereby enters this disclaimer to claims 1, 2, and 10 of said patent.

[*Official Gazette February 5, 1974*]